April 5, 1966 E. MELANSON 3,243,858
FASTENER COMPONENTS ADAPTED FOR ELECTRONIC HEAT SEALING
Filed May 8, 1964
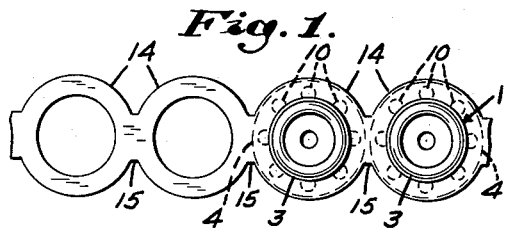
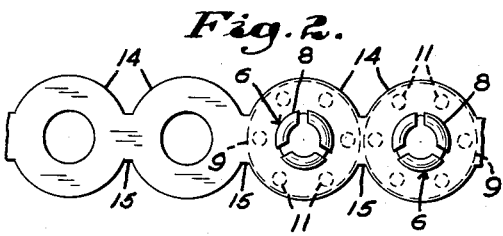
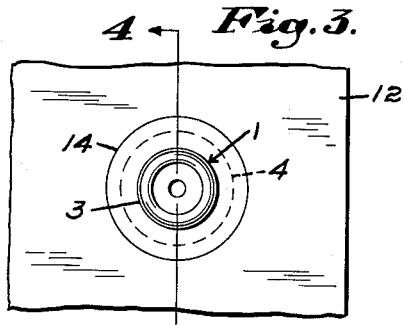
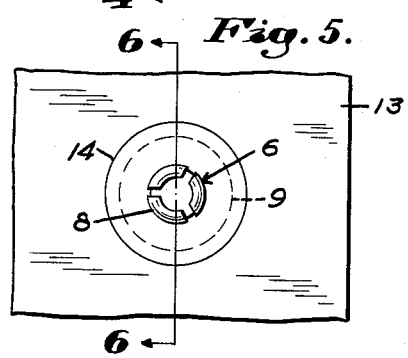
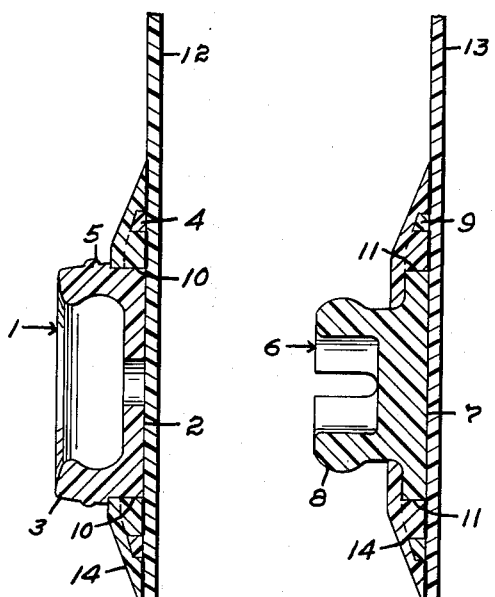
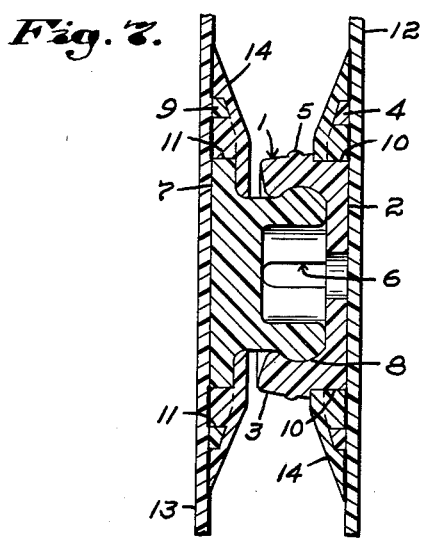
Inventor:
Everett Melanson,
by Philip E. Parker
Atty.

United States Patent Office 3,243,858
Patented Apr. 5, 1966

3,243,858
FASTENER COMPONENTS ADAPTED FOR ELECTRONIC HEAT SEALING
Everett Melanson, Wakefield, Mass., assignor to United-Carr Incorporated, Boston, Mass., a corporation of Delaware
Filed May 8, 1964, Ser. No. 366,001
2 Claims. (Cl. 24—208)

This invention relates generally to improvements in articles of manufacture or more specifically to fastener components which may be attached to a garment or any other support utilizing the electronic welding technique commonly referred to by those skilled in the plastics art as dielectric heat sealing.

Recent developments in thermoplastics have resulted in the introduction of commercial manufacturers of fasteners, and a host of other commercial products, to new, highly versatile materials characterized by a high degree of strength and stiffness along with exceptional toughness and resilience. Two of the better known and more widely used of these materials are the acetal resin "Delrin," developed by Du Pont and the tough polycarbonate "Lexan," a product of the General Electric Company.

Recently conducted comparative performance tests between efficient snap fasteners of molded vinyl, in particular polyvinyl chloride, and "Delrin" fasteners indicate that the force required to engage the components of an efficient vinyl fastener is approximately five times greater than that required for the highly resilient "Delrin" parts. Further and somewhat more significant, when the same fasteners were subjected to a pull in shear, simulating the stress which would be exerted on the fastening of a garment which was being stretched or placed in tension, the "Delrin" fasteners withstood a pull from one third to one half again as great as did the vinyl parts prior to becoming disengaged. These experiments poignantly demonstrate the functional advantages to be derived from the use of these newer materials in the fastener art.

However, as compared with parts of other molded plastics and in particular vinyl, for example polyvinyl chloride, the Delrin and Lexan components present one salient disadvantage; that is, they cannot be effectively electronically welded to supporting garments.

To be more precise, the vinyl parts respond excellently to high frequency current and produce a superior weld when pressure from a die is applied; whereas the newer materials Delrin, Lexan, etc., for the most part do not respond to high frequency welding at all, or respond poorly, resulting in inconsistent seals.

It is therefore an object of this invention to provide fastener components of tough, hard, exceptionally resilient, basically nonheat-sealable material which are adapted to be electronically sealed to an article in a highly efficient manner.

A further object is to provide strips of fastener components, of basically nonheat-sealable material which are adapted to be fed from a reel or other storage vehicle to automatic fastener applying and sealing equipment.

Additional objects and advantages of the invention will become evident from a reading of the following detailed description in conjunction with a viewing of the accompanying drawings in which:

FIG. 1 is a plan view of a strip of attaching washers and fastener sockets;
FIG. 2 is a plan view of a strip of attaching washers and fastener studs;
FIG. 3 is a plan view of one of the sockets of FIG. 1 secured to a supporting garment;
FIG. 4 is a section taken on line 4—4 of FIG. 3;
FIG. 5 is a plan view similar to FIG. 3 showing one of the studs of FIG. 1 secured to an article;
FIG. 6 is a section taken on line 6—6 of FIG. 5; and
FIG. 7 is a sectional view of an installation depicting the coupled fastener components securing two panels.

In the drawings FIGS. 3–6 depict the cooperating components of a snap fastener combination fusedly anchored to two panels by attaching washers. As a convenient means of disclosure the components per se are to be considered to have been molded of the newer thermoplastic resin "Delrin" previously discussed. Further, the attaching washers are of polyvinyl chloride and the panels represent the closure flaps of a garment for example, a pair of vinyl baby pants. The aforementioned materials have been chosen in that vinyl is considered to be the thermoplastic most conducive to high frequency electric heat sealing; however, it is recognized that other heat sealable thermoplastics, for example nylon, might be employed and the garment might even be of a textile such as cotton cloth and still effectively accept the weld.

The socket 1 includes a base portion 2, a hollow post 3 extending from said base, a flange 4 circumscribing the base 2, and a narrow washer retaining ring 5 peripherally disposed on the post 3.

The stud 6 is similarly comprised of a base 7, a hollow segmented post 8 extending from said base and a flange 9 peripherally circumscribing the base 7.

In the light of the features of the invention in which novelty is seen to abide and since the snap fastener combination has been selected solely for disclosure purposes, further detailed description of the configuration of the posts 3 and 8 would appear to be superfluous.

Suffice it to state here that the concave cavity in the post 3 will co-operatively receive the bulbous head of the post 8, in snapping engagement therewith as shown in FIG. 7.

Each of the flanges 4 and 9 of the socket and stud respectively has a plurality of apertures 10 and 11 formed therein. With regard to the socket 1, the apertures 10 are formed immediately adjacent the base 2 and as shown in FIG. 4 partially undercut the post 3. The apertures 11 are formed nearer the outer periphery of the flange 9 somewhat remote from the post 8 and the base 7 of the stud 6.

The socket 1 and the stud 6 are secured at a surface of the vinyl panels 12 and 13 respectively, as will be more fully explained hereinafter, by a vinyl attaching washer 14 which completely overlies the flanges and is fusedly welded at a surface of the panels both extraperipheral of the flanges 4 and 9 and immediately adjacent each of the apertures 10 and 11. Thus a portion of each of the flanges 4 and 9 is co-operatively encapsulated by portions of the washers and panels and the "Delrin" parts are firmly held in abutting relationships to the panels.

FIGS. 1 and 2 are illustrative of strips of "Delrin" fastener components which are adapted to be reeled for storage and shipment purposes and/or fed into an automatic fastener applying and sealing apparatus such as that disclosed in Patent No. 3,049,462 issued August 14, 1962, of which the applicant was a co-inventor. As is readily observed the attaching washers completely surround each of the posts 3 and 8 and overlie each of the flanges 4 and 9 to include the apertures 10 and 11 formed therein. Each of the washers is in turn connected by a narrow severable vinyl web 15 to provide a continuous strip of components.

To secure either of the fastener's components, the garment 12 or 13 is placed on the lower die and the strip is fed into the upper attaching head, whence the web 14 is severed and the part welded to the garment with the apparatus functioning overall exactly as described in the referenced patent.

The major difference in the finished product, as it were, from that disclosed in the reference, is that in this instance it is the vinyl attaching washer 14 and not the base or flange of the component which is fusedly joined to the garment. To be more specific, when the high frequency current is applied under pressure through the upper die, which acts as an electrode, the vinyl washer is dielectrically heated and becomes sufficiently molten to flow through the apertures 10 and 11 and outwardly around the periphery of each of the flanges 4 and 9. Thus when the current flow is interrupted, as explained in the reference, the vinyls of the washer and panel are fused under pressure circumferentially each of the flanges and immediately adjacent each of the apertures 10 and 11. The resultant encapsulation of portions of each of the flanges produces a strong, highly efficient attachment which will effectively withstand the various stresses exerted on the fastener over periods of continuous, normal usage.

It is further to be understood that what has been disclosed herein represents only a single embodiment of the invention. For example, it is anticipated that many varieties of fasteners including those of metal construction might be adapted for attachment by heat sealing in the manner disclosed herein.

The description is therefore to be interpreted in an illustrative rather than a limiting sense; the scope of the invention being best described in the appended claims.

What is claimed is:

1. A strip of fastener members for use in automatic fastener component applying and heat sealing equipment wherein each fastener is individually severed and selectively sealed automatically to a support from the continuous strip comprising a series of components each having a base portion, an upstanding post extending from said base portion, and an integral perforate flange disposed about at least one of said base portion and said post, said base, post and flange being of a tough, hard, non-heat-sealable material, and a series of heat-sealable thermoplastic washers, each of said washers circumscribing each of said posts and overlying said perforations in said flange whereby said fastener members may be electronically sealed to an article at the periphery of said flange and opposite each of the perforations in said flange, said washers being joined by an integral, severable web of thermoplastic material to provide continuity in said strip.

2. An assembly comprising, in combination, a support, a unitary fastening device of hard, tough, nonheat-sealable material including a base portion, an upstanding post extending longitudinally from said base portion, and an integral peripheral flange extending laterally outwardly from one of said base portion and said post, said flange having a series of through apertures formed therein and disposed about said post, and attaching means securing said fastening device to said support, said attaching means being in the form of a washer of synthetic thermoplastic material having certain portions thereof superimposed on the surface of said flange remote from said support, other portions thereof heat-sealed to said support extraperipherally of said flange, and still further portions thereof extending through said flange and heat-sealed to said support opposite the apertures in said flange whereby portions of said flange are encapsulated between said washer and said support.

References Cited by the Examiner

UNITED STATES PATENTS

| 2,230,879 | 2/1941 | Bronson | 156—120 X |
| 2,745,160 | 5/1956 | Jones | 24—217 |
| 3,181,219 | 5/1965 | Deshaies | 24—203 |

FOREIGN PATENTS

| 360,591 | 3/1906 | France. |
| 1,166,676 | 6/1958 | France. |
| 675,402 | 5/1939 | Germany. |
| 784,528 | 10/1957 | Great Britain. |

WILLIAM FELDMAN, *Primary Examiner.*

E. SIMONSEN, *Assistant Examiner.*